US009203942B2

(12) United States Patent
Joo

(10) Patent No.: US 9,203,942 B2
(45) Date of Patent: Dec. 1, 2015

(54) MOBILE COMMUNICATION DEVICE

(75) Inventor: Won-Seok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1327 days.

(21) Appl. No.: 11/955,227

(22) Filed: Dec. 12, 2007

(65) Prior Publication Data

US 2008/0218371 A1   Sep. 11, 2008

(30) Foreign Application Priority Data

Mar. 6, 2007 (KR) .................. 10-2007-0026327
Mar. 16, 2007 (KR) .................. 10-2007-0026326

(51) Int. Cl.
*G06F 3/02* (2006.01)
*H04M 1/22* (2006.01)
*H04M 1/02* (2006.01)
*H04M 1/23* (2006.01)

(52) U.S. Cl.
CPC ............ *H04M 1/22* (2013.01); *H01H 2209/082* (2013.01); *H01H 2219/039* (2013.01); *H01H 2219/044* (2013.01); *H01H 2231/022* (2013.01); *H04M 1/0283* (2013.01); *H04M 1/23* (2013.01)

(58) Field of Classification Search
CPC .................. G06F 3/0238; G06F 3/044; G06F 2203/04103; H04M 1/0283; H01H 13/83; H01H 2219/039
USPC ..................... 345/87–104, 32, 170, 172–178; 385/131; 359/385; 200/308–317; 40/443; D14/341; 178/18.06
See application file for complete search history.

(56) References Cited

U.S. PATENT DOCUMENTS

| 4,611,406 | A | * | 9/1986 | Engstrom et al. ................ 33/443 |
| D337,569 | S | * | 7/1993 | Kando ........................ D14/341 |
| 5,408,060 | A | * | 4/1995 | Muurinen ...................... 200/314 |
| 5,695,345 | A | * | 12/1997 | Weiner et al. .................. 434/317 |
| D408,794 | S | * | 4/1999 | Ogasawara .................. D14/341 |
| 6,158,156 | A | * | 12/2000 | Patrick ............................ 40/443 |
| 6,196,738 | B1 | | 3/2001 | Shimizu et al. |
| D439,897 | S | * | 4/2001 | Williams et al. ............. D14/345 |
| D464,646 | S | * | 10/2002 | Lin .............................. D14/341 |
| D469,792 | S | * | 2/2003 | Kawashima ................. D16/134 |
| 6,835,906 | B2 | * | 12/2004 | Okamoto et al. ............. 200/341 |

(Continued)

FOREIGN PATENT DOCUMENTS

CN  1627764 A  6/2005
DE  32 35 752 A1  3/1984

(Continued)

*Primary Examiner* — Stephen Sherman
*Assistant Examiner* — Aaron Midkiff
(74) *Attorney, Agent, or Firm* — Birch, Stewart, Kolasch & Birch, LLP

(57) ABSTRACT

A mobile communication device configured to operate in at least a first mode and a second mode is provided. The mobile communication device includes a housing, a light emitting unit configured to emit at least a first color when the mobile communication device is operated in the first mode and to emit a second color when the mobile communication device is operated in the second mode, and a filtering unit having at least a first pattern associated with the first mode and a second pattern associated with the second mode. The filtering unit is configured to display the first pattern with the first color in the housing when the mobile communication device is operated in the first mode and to display the second pattern with the second color in the housing when the mobile communication device is operated in the second mode.

10 Claims, 10 Drawing Sheets

(56) References Cited

U.S. PATENT DOCUMENTS

| | | | |
|---|---|---|---|
| 7,098,414 B2 * | 8/2006 | Caldwell | 200/310 |
| 7,747,006 B2 * | 6/2010 | Kim et al. | 379/434 |
| 2004/0108994 A1 | 6/2004 | Kato | |
| 2005/0024599 A1 * | 2/2005 | Katagami et al. | 353/84 |
| 2005/0140657 A1 | 6/2005 | Park et al. | |
| 2006/0037848 A1 * | 2/2006 | Kobayashi | 200/310 |
| 2006/0132458 A1 * | 6/2006 | Garfio et al. | 345/173 |
| 2006/0181899 A1 * | 8/2006 | Onishi | 362/600 |
| 2006/0221021 A1 * | 10/2006 | Hajjar et al. | 345/84 |
| 2007/0046637 A1 | 3/2007 | Choo et al. | |
| 2007/0126714 A1 * | 6/2007 | Imamura | 345/173 |
| 2007/0205088 A1 * | 9/2007 | Lee et al. | 200/314 |
| 2007/0285913 A1 * | 12/2007 | Cybart et al. | 362/24 |
| 2009/0052028 A1 | 2/2009 | Umemoto et al. | |

FOREIGN PATENT DOCUMENTS

| | | |
|---|---|---|
| EP | 0 508 563 A1 | 1/1992 |
| EP | 1 542 437 A2 | 6/2005 |
| EP | 1 542 437 A3 | 6/2005 |
| EP | 1 628 459 A1 | 2/2006 |
| KR | 10-2005-0058582 A | 6/2005 |
| TW | 428185 B | 4/2001 |
| TW | I222005 B | 10/2004 |
| TW | M291909 | 1/2006 |
| TW | 200630925 | 9/2006 |
| TW | I274918 B | 3/2007 |

* cited by examiner

MOBILE COMMUNICATION DEVICE

CROSS REFERENCE TO RELATED APPLICATIONS

This application claims priority to Korean Patent Application No. 10-2007-0026326, filed Mar. 16, 2007, and Korean Patent Application No. 10-2007-0026327, filed Mar. 16, 2007, both of which are herein incorporated by reference.

BACKGROUND OF THE INVENTION

1. Field of the Invention

The present invention relates to a mobile communication device, and more particularly, to a mobile communication device having a plurality of colors displayed on a key area.

2. Description of Related Art

A mobile communication device such as a portable phone or a personal digital assistant (PDA) is a portable electronic device having functions that allow a user to wirelessly transmit information or to process the information while being carried by the user.

Recent consumer demands have called for mobile communication devices that are capable of implementing various functions while becoming more compact. Yet, while the demand has been for smaller mobile communication devices, consumers desire mobile communication devices with an interface that enhance the user's convenience.

Generally, mobile communication devices are provided with a keypad for operating most functions of the mobile communication device or inputting key buttons, and an illuminating device such as a light emitting diode (LED) so that the key buttons can be operated even in a dark place.

As the user presses the key buttons of the keypad, corresponding switches are operated to allow the key buttons to input characters, numbers, symbols, or otherwise control the mobile communication device. Also, light generated from the LED illuminates the key buttons, thereby allowing the user to recognize each position and symbol of the key buttons.

However, the LED for illuminating the key buttons only serves to backlight the key buttons and does not provide additional identification information.

BRIEF SUMMARY OF THE INVENTION

Therefore, an object of the present invention is to provide a mobile communication device capable of enhancing a user's interface and utilization degree by implementing various patterns and/or colors on a key area.

To achieve these and other advantages and in accordance with the purpose of the present invention, as embodied and broadly described herein, there is provided a mobile communication device configured to operate in at least a first mode and a second mode. The mobile communication device includes a housing, a light emitting unit configured to emit at least a first color when the mobile communication device is operated in the first mode and to emit a second color when the mobile communication device is operated in the second mode, the light emitting unit being located in the housing, and a filtering unit having at least a first pattern associated with the first mode and a second pattern associated with the second mode. The filtering unit is configured to display the first pattern with the first color in the housing when the mobile communication device is operated in the first mode and to display the second pattern with the second color in the housing when the mobile communication device is operated in the second mode. The filtering unit is located in the mobile communication device.

In another aspect, the housing may include a key area and the filtering unit may be configured to display the first pattern with the first color in the key area when the mobile communication device is operated in the first mode and to display the second pattern with the second color in the key area when the mobile communication device is operated in the second mode.

In another aspect, the housing may be formed of a transparent resin.

In still another aspect the housing may include a base cover and a shielding layer located on the base cover. The shielding layer may be configured to at least partially shield the filtering unit.

In a further aspect the shielding layer may include a transparent print layer located on the base cover and a transparent protection layer located on the transparent print layer to protect the printed layer. The transparent protection layer may include a resin film, the print layer is first printed onto the resin film, and then the resin film is located on the base cover by in-molding. Alternatively, the print layer may be printed onto the base cover and then a transparent material may be coated thereon to form the transparent protection layer.

In still a further aspect, a touch sensing layer may be located at one of inside the base cover and outside of the base cover. The touch sensing layer is configured to generate an input signal by sensing a touch applied to the housing. The touch sensing layer may be a capacitance touch sensing layer configured to generate a signal by sensing a change of a capacitance generated by a touch. The filtering unit may be located below the touch sensing layer.

In another aspect, a light guiding layer may be located below the filtering unit. The light guiding layer may be configured to guide light emitted from the light emitting unit in a horizontal direction.

In still another aspect, a reflecting layer may be located below the light guiding layer. The reflecting layer may be configured to reflect light emitted from the light guiding layer outwards towards the filtering unit.

In a different aspect, the first pattern of the filtering unit corresponding to the first mode and the second pattern of the filtering unit corresponding to the second mode may be spaced from each other. Alternatively, the first pattern of the filtering unit corresponding to the first mode and the second pattern of the filtering unit corresponding to the second mode may overlap each other.

In yet another aspect, the first pattern of the filtering unit corresponding to the first mode and the second pattern of the filtering unit corresponding to the second mode may be formed on the same layer. Alternatively, the first pattern of the filtering unit corresponding to the first mode and the second pattern of the filtering unit corresponding to the second mode may be formed on different layers.

In another aspect, the filtering unit may include a thin film having a thickness selected to filter each wavelength of color lights emitted from the light emitting unit except for the first color and second color.

In a different aspect, at least one of the first pattern and second pattern may be one of decorative symbols and designs. Where at least one of the first mode and second mode is a standby mode, the one of decorative symbols and designs are visible in the standby mode.

In yet another aspect, the mobile communication device includes a plurality of buttons located in the housing, and the filtering unit is configured to display the first pattern corresponding to the first color on a portion of the plurality of buttons when the mobile communication device is operated in the first mode and to display the second pattern corresponding to the second color on a portion of the plurality of buttons when the mobile communication device is operated in the second mode.

In a further aspect, each of the plurality of buttons may be formed of a transparent material.

In still another aspect, a shielding layer may be located between the plurality of buttons and the filtering unit. The shielding layer may be configured to at least partially shield the filtering unit. The shielding layer may be a transparent resin. Alternatively, the shielding layer may be a transparent print layer printed onto a transparent resin.

In a further aspect, the mobile communication device may include a plurality of dome switches located beneath the filtering unit, each dome switch being associated with one of plurality of button, and a pad located on a lower surface of the filtering unit. The pad may have a pressurizing protrusion corresponding to each of the plurality of buttons, each pressuring protrusion being configured to contact the corresponding dome switch when the corresponding button is pressed.

In yet a further aspect, a substrate may be located below the pad. The substrate may have the plurality of dome switches and the light emitting unit located thereon.

In still a further aspect, a reflection layer may be located on an upper surface of the substrate, and the reflection layer may be configured to reflect light from the light emitting unit towards the filtering unit.

In a different aspect, a light guiding layer may be located between the filtering unit and the pad, and the light guiding layer may be configured to guide light emitted from the light emitting unit in a horizontal direction.

In another aspect, the first pattern of the filtering unit corresponding to the first mode and the second pattern of the filtering unit corresponding to the second mode may be spaced from each other. Alternatively, the first pattern of the filtering unit corresponding to the first mode and the second pattern of the filtering unit corresponding to the second mode may overlap each other.

In a different aspect, the first pattern of the filtering unit corresponding to the first mode and the second pattern of the filtering unit corresponding to the second mode may be formed on the same layer. Alternatively, the first pattern of the filtering unit corresponding to the first mode and the second pattern of the filtering unit corresponding to the second mode may be formed on different layers.

In yet another aspect, the filtering unit may include a thin film having a thickness selected to filter each wavelength of color lights emitted from the light emitting unit except for the first color and second color.

In a further aspect, the filtering unit may be printed onto a resin configured to contract the plurality of buttons is pressed.

In accordance with the purpose of the present invention, as embodied and broadly described herein, there is provided a mobile communication device configured to operate in at least a first mode and a second mode. The mobile communication device includes a housing, a light emitting unit configured to emit at least a first color when the mobile communication device is operated in the first mode and to emit a second color when the mobile communication device is operated in the second mode, the light emitting unit being located in the housing, and a filtering unit having at least a first pattern associated with the first mode and a second pattern associated with the second mode. The filtering unit defines an exterior surface of the mobile communication device, and the filtering unit may be configured to display the first pattern with the first color at the exterior surface when the mobile communication device is operated in the first mode and to display the second pattern with the second color at the exterior surface when the mobile communication device is operated in the second mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the preferred embodiments of the present invention, examples of which are illustrated in the accompanying drawings. Wherever possible, like reference numbers have been used for like parts and subsequent discussion of the like parts are omitted. Hereinafter, mobile communication devices according to the present invention will be explained in more detail.

Figure 1:
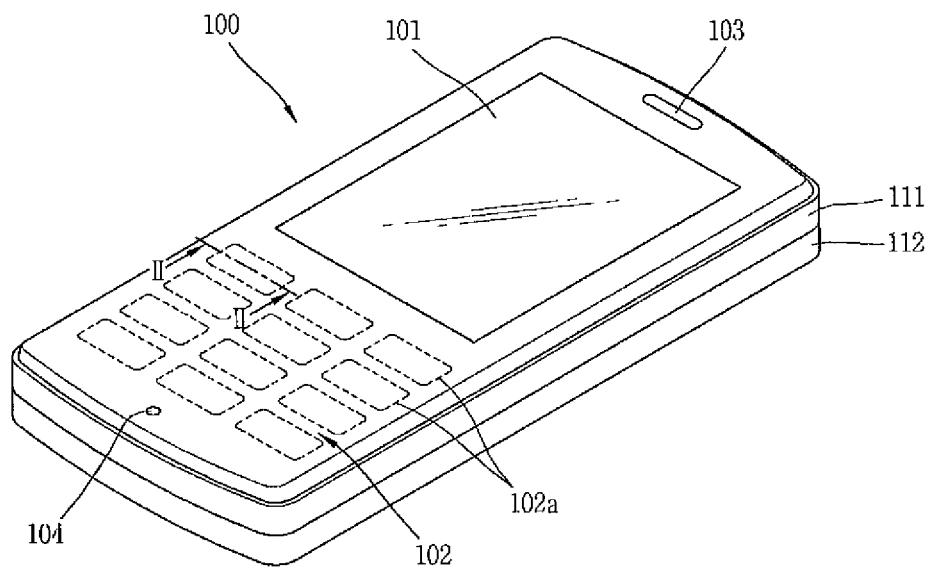
FIG. 1 is a perspective view showing a mobile communication device according to a first embodiment of the present invention.

As seen in FIG. 1, a mobile communication device 100 includes a keypad 102 having a plurality of key areas 102a for inputting characters, numbers, or symbols. The characters, numbers, or symbols displayed on each of the key areas 102a can be selectively recognized by illumination from inside the keypad 102. A receiver (not shown), a speaker 103, and a microphone 104 may be respectively disposed at upper and lower ends of the mobile communication device 100.

The mobile communication device 100 may have two or more operating modes. For instance, the mobile communication device 100 may have a standby mode, a dialing mode, a calling mode, a phone-relevant mode such as message transmission or message storage, along with other additional function modes. The keypad 102 may have a different setting according to each of the modes.

Figure 2:
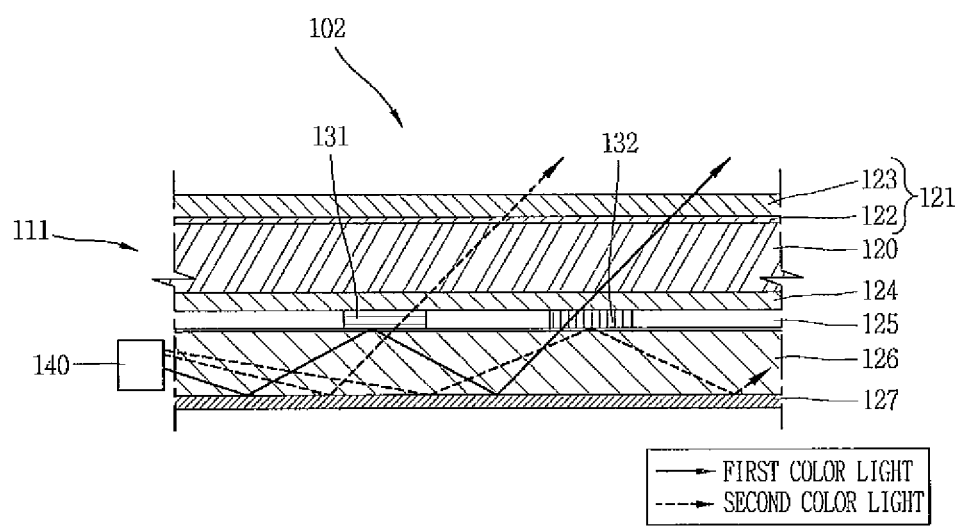
FIG. 2 is a sectional view showing the mobile communication device of FIG. 1 taken along line II-II.

As seen in FIG. 2, the keypad 102 includes a front housing 111 having the different key areas 102a, and a light emitting unit 140 disposed in the front housing 111 for emitting different color lights according to each mode of the mobile communication device 100. Filtering parts 131 and 132, each having at least two patterns according to each mode for displaying only patterns corresponding to a selected color light on the key areas 102a, are disposed inside the front housing 111.

The front housing 111 also includes a base cover 120, and a shielding layer 121 disposed on the base cover 120 for at least partially shielding the filtering parts 131 and 132. The base cover 120 may be formed of a transparent material formed on resin. If the keypad 102 is a touch type keypad, the base cover 120 is preferably formed to be thick enough to maintain a predetermined rigidity to withstand repeated touching.

The shielding layer 121 includes a printing layer 122 disposed on the base cover 120, which is formed of a transparent material, and a transparent protecting layer 123 disposed on the printing layer 122 for protecting the printing layer 122. The printing layer 122 can be implemented by printing ink having an arbitrary color onto a resin film so as to shield the filtering parts 131 and 132 or the light emitting unit 140 when light does not originate from the light emitting unit 140. Herein, the term "transparent" can be understood as fully transparent, semi-transparent, or transmissive.

The transparent protecting layer 123 may be implemented by in-molding a transparent resin film. That is, once the printing layer 122 has been printed onto a transparent resin film, the printed transparent resin film may be integrally molded to the base cover 120. Accordingly, the resin film serves as the transparent protecting layer 123.

Alternatively, the printing layer 122 having been printed on a film is transferred onto the base cover 120. Then, the film is removed, and a transparent material is coated onto the base cover 120 on which the printing layer 122 has been formed. The transparent material may be coated onto the base cover 120 by a deposition, etc. In this arrangement, the transparent material serves as the transparent protecting layer 123.

The front housing 111 may be formed of a transparent resin that is different from the base cover 120 and the shielding layer 121. In the present embodiment, the front housing 111 may be formed by mixing a pigment to a transparent resin.

Referring again to FIG. 2, a touch sensing layer 124 for generating an input signal by sensing each touch applied to the front housing 111 is provided below the base cover 120. The touch sensing layer 124 may be implemented by coating a film having a conductive material such as an indium-tin-oxide (ITO) onto an inner surface of the base cover 120. In this exemplary embodiment, the touch sensing layer 124 may be implemented as a capacitance type touch sensing layer for generating a signal by sensing change of a capacitance applied to the key area of the front housing 111 according to each touch.

A filtering unit 125 including the filtering parts 131 and 132 is disposed below the touch sensing layer 124. A light guiding layer 126 for outwardly guiding light emitted from the light emitting unit 140 is disposed below the filtering unit 125.

The filtering parts 131 and 132 may each be implemented as a thin film having a thickness sufficient to filter each wavelength of light emitted from the light emitting unit 140 except for a specific color light corresponding to the filtering parts 131 and 132. The filtering parts 131 and 132 selectively filter light by using an interference of light reflected at an interface between the thin films. The filtering parts 131 and 132 may be implemented as a triangular prism having regular and rough surfaces of different angles so as to selectively transmit colored light.

As a result, the filtering part for selectively transmitting light emitted from the light emitting unit 140 consists of the first filtering part 131 for transmitting a first color light emitted from the light emitting unit 140, and the second filtering part 132 for transmitting a second color light emitted from the light emitting unit 140. For instance, the first and second color lights may be implemented as a blue light and a red light, respectively. The first filtering part 131 is formed to have a predetermined thickness or is surface-processed so that only a blue light can be transmitted and a red light can be reflected or shielded. The second filtering part 132 is formed to have a thickness or is surface-processed so that only a red light can be transmitted and a blue light can be reflected or shielded.

The light emitting unit 140 may be implemented as an LED so as to provide less power consumption. In addition, the light emitting unit 140 may be implemented to emit various color lights according to each mode, or may be implemented by grouping each unit for emitting each color.

A reflecting layer 127 for reflecting light emitted from the light guiding layer 126 towards the filtering unit 125 is disposed below the light guiding layer 126. The reflecting layer 127 may be formed by attaching a tape having an adhesion surface such as a mirror surface or a white surface to the light guiding layer 126, or by plating a metal on the light guiding layer 126.

Figure 3A:
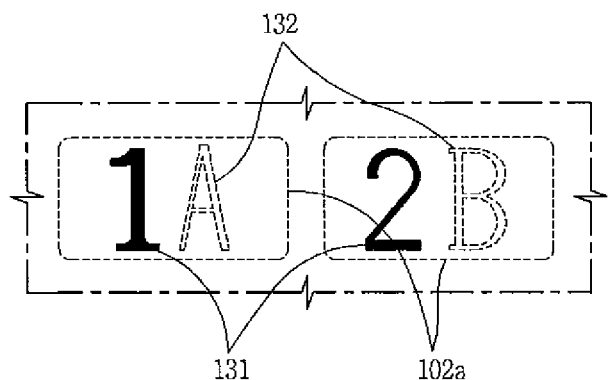
FIGS. 3A and 3B are operation views showing that characters or numbers are displayed on a key area with different colors according to each mode in accordance with the first embodiment of the present invention.
Figure 3B:
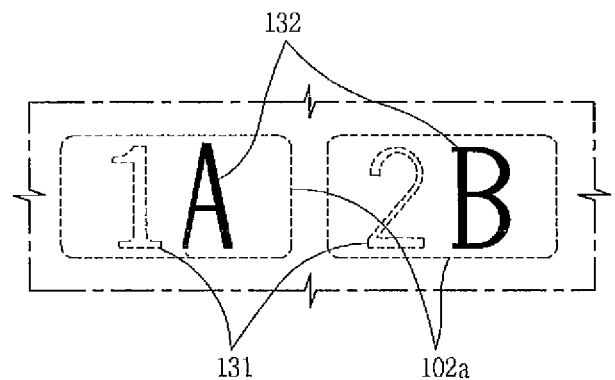

As best seen in FIGS. 2, 3A, and 3B, when the mobile communication device 100 is in a first mode, a first color light is emitted from the light emitting unit 140. Then, the first color light is reflected in the light guiding layer 126 to progress in a horizontal direction. When the first color light is incident onto the second filtering part 132, the second filtering part 132 shields the first color light. Accordingly, the first color light disappears, or is reflected thus to keep on progressing. When the first color light is incident onto the first filtering part 131, the first filtering part 131 transmits the first color light to allow a user to recognize light having the patterns of the first filtering part 131. Accordingly, the user can use input keys set according to the first mode in a touch manner (FIG. 3A).

When the mobile communication device 100 is in a second mode, a second color light is emitted from the light emitting unit 140. The second color light disappears or is reflected by the first filtering part 131, but passes through the second filtering part 132. Accordingly, the user can recognize light having the patterns of the second filtering part 132 (FIG. 3B).

Figure 4A:
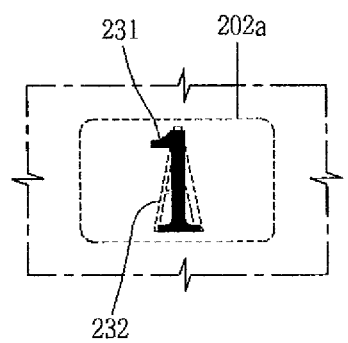
FIGS. 4A and 4B are operation views showing that characters or numbers are displayed on a key area with different colors according to each mode in accordance with a second embodiment of the present invention.
Figure 4B:
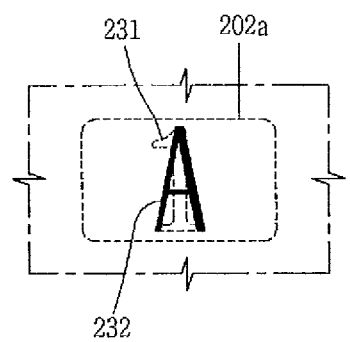

In accordance with a second exemplary embodiment, rather than having the first filtering part 131 and the second filtering part 132 being disposed to be spaced from each other, a first filtering part 231 and a second filtering part 232 are disposed to be overlapped with each other, as seen in FIGS. 4A and 4B. One advantage with this arrangement of the keypad is that the key areas can be reduced, thereby resulting in a smaller keypad than that shown in FIGS. 3A and 3B.

Figure 5:
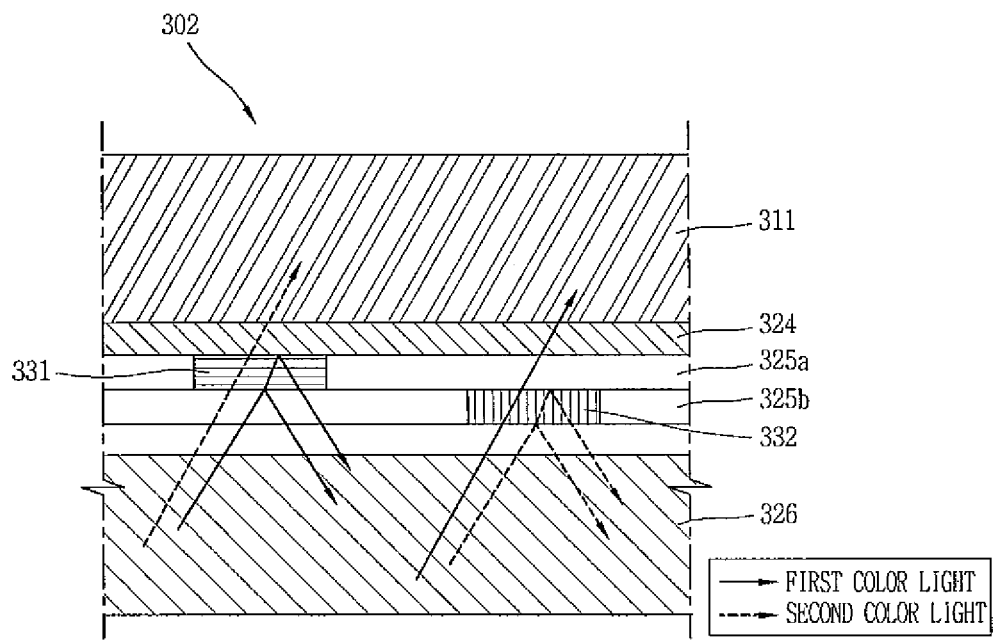
FIG. 5 is a sectional view partially showing the inside of a housing having filtering units positioned on different layers according to a third embodiment of the present invention.

In accordance with a third exemplary embodiment, as seen in FIG. 5, a first filtering part 331 and a second filtering part 332 are disposed on different filtering layers 325a and 325b of filtering unit 325, respectively. Since the first filtering part 331 and the second filtering part 332 are disposed on different filtering layers 325a and 325b, respectively, an entire fabrication processing is facilitated by requiring only a single filtering part being located on a single filtering layer.

Figure 6:
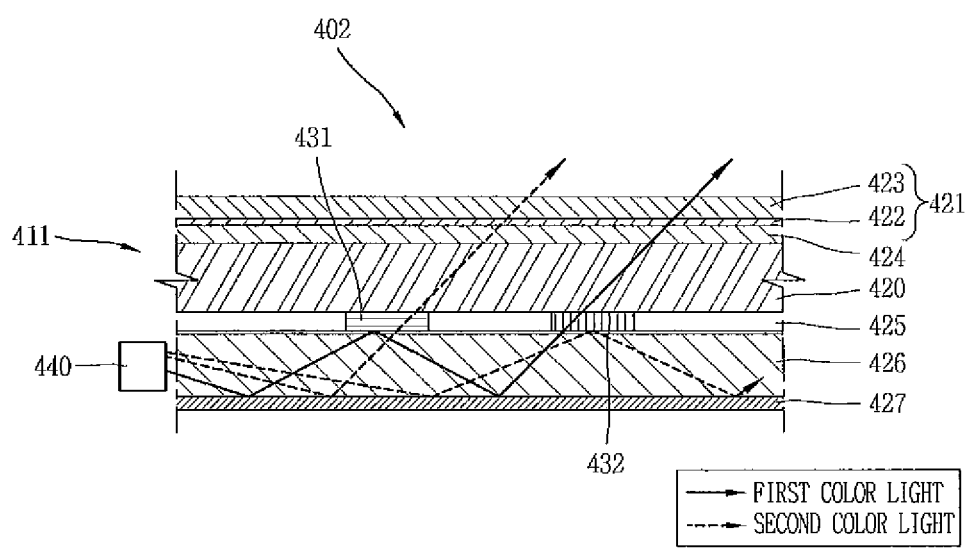
FIG. 6 is a sectional view showing a housing having a reflection plate therein according to a fourth embodiment of the present invention.

FIG. 6 shows a fourth exemplary embodiment where a touch sensing layer 424 may be positioned on an upper surface of the base cover 420. In this arrangement, the touch sensing layer 424 is disposed on the base cover 420, and a printing layer 422 and a transparent protecting layer 423 are disposed on the touch sensing layer 424. Filtering unit 425 including the filtering parts 431 and 432 are located on a lower surface of the base cover 420. A light guiding layer 426 and a light emitting unit 440 are disposed below the base cover 420. The light guiding layer may include a reflecting layer 427 formed thereon.

Figure 7:
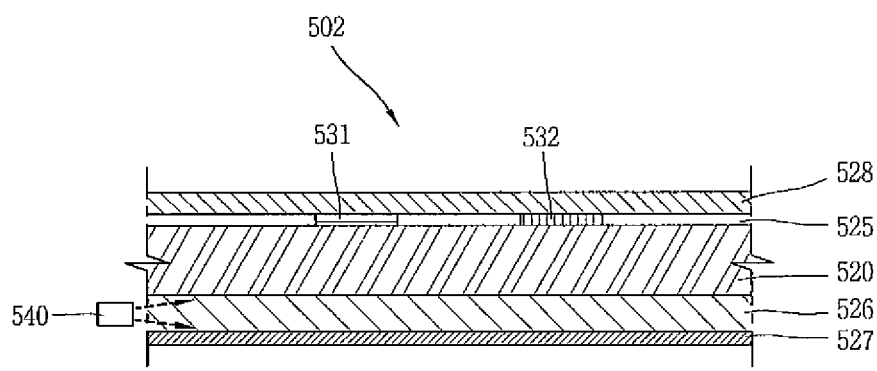
FIG. 7 is a sectional view showing a housing having a filter layer on a base cover according to a fifth embodiment of the present invention.
Figure 8:
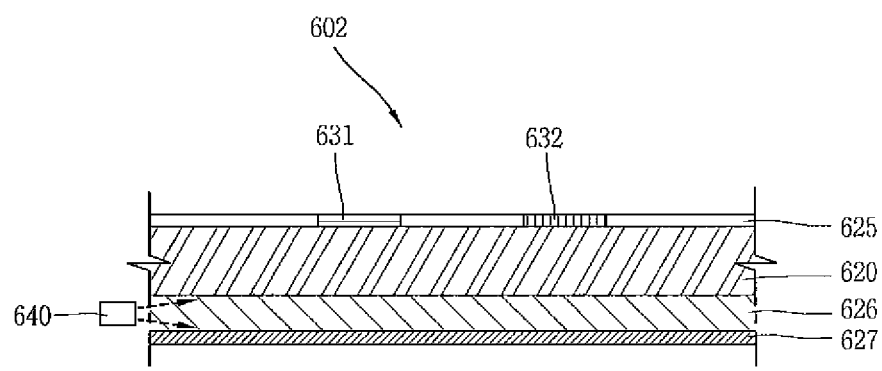
FIG. 8 is a sectional view showing a housing without a resin layer over the filtering units according to a sixth exemplary embodiment of the present invention.

In accordance with a fifth exemplary embodiment, as seen in FIG. 7, a filtering unit 525 is disposed on an upper surface of a base cover 520. Filtering parts 531 and 532 may be printed onto a film deposited on the base cover 520. A resin film 528 may be laminated on the filtering parts 531 and 532, thereby protecting the filtering parts 531 and 532 from external impact or scratching. A light guiding layer 526 and a light emitting unit 540 are disposed below the base cover 520. The light guiding layer may include a reflecting layer 527 formed thereon.

In accordance with a sixth exemplary embodiment, a filtering unit 625 is disposed on an upper surface of a base cover 620. Filtering parts 631 and 632 may be printed onto a film deposited on the base cover 620. A light guiding layer 626 and a light emitting unit 640 are disposed below the base cover 620. The light guiding layer may include a reflecting layer 627 formed thereon. This arrangement is similar to the fifth exemplary embodiment except that the resin layer has been excluded.

Figure 9:
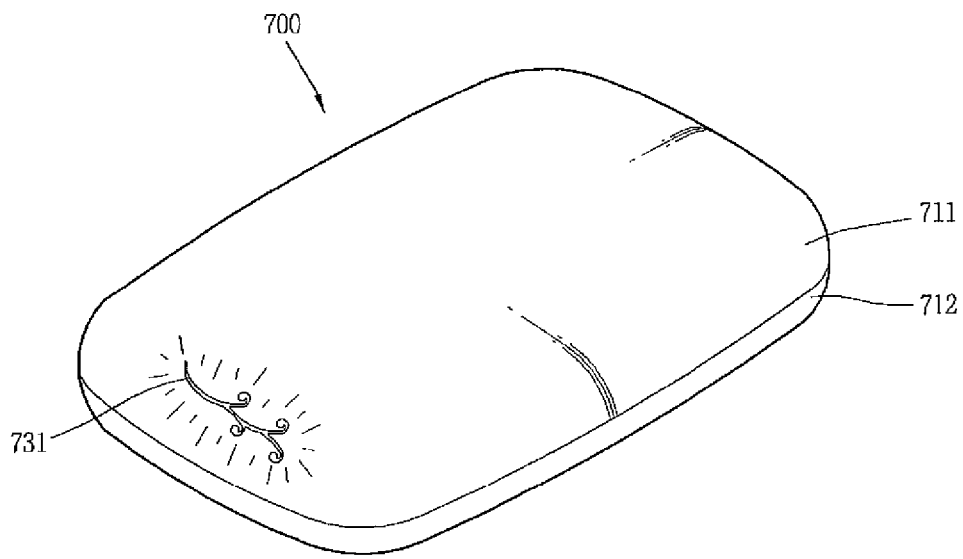
FIG. 9 is a perspective view showing an appearance of a mobile communication device being in a standby mode according to a seventh embodiment of the present invention.
Figure 10:
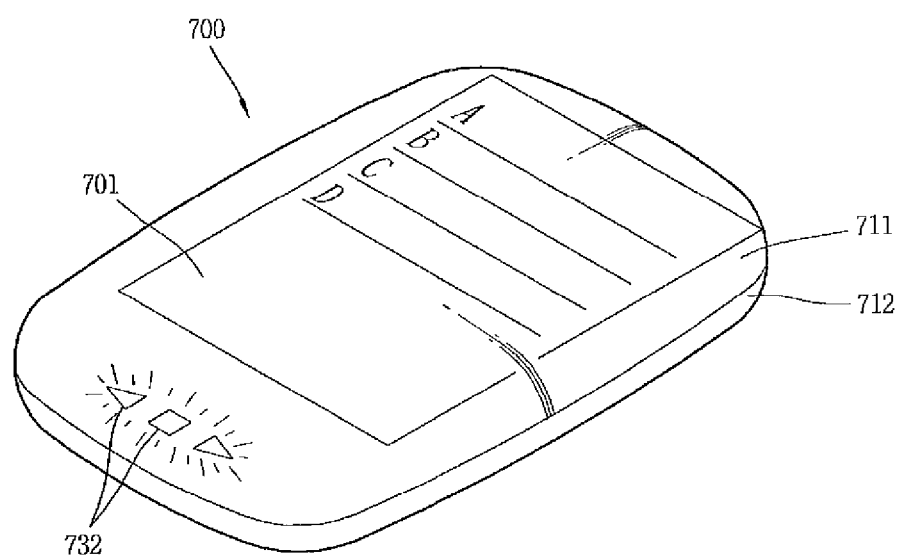
FIG. 10 is a perspective view showing an appearance of the mobile communication device of FIG. 8 being in an operation mode.

FIG. 9 is a perspective view showing an appearance of a mobile communication device being in a standby mode according to a seventh embodiment of the present invention, and FIG. 10 is a perspective view showing an appearance of the mobile communication device of FIG. 9 being in an operation mode.

As seen in FIG. 9, a mobile communication device 700 includes a front housing 711 and a rear housing 712 having no sharp edge or boundary. The front housing 711 is formed to have an integral simple curve having no sharp edges to divide a front surface and a side surface of the front housing 710 from each other.

A display 701 may be provided in the front housing 711. A first filtering part 731 having a decorative pattern, and a second filtering part 732 having key patterns for controlling directions, are disposed at a lower portion of the front housing 711.

The filtering parts 731 and 732 may be disposed at each decorating part of the housings 711 and 712. For instance, when a camera is mounted at the mobile communication device, the filtering parts 731 and 732 may be disposed near a camera lens, a display, or a speaker.

As seen in FIG. 9, when the mobile communication device 700 is in a standby mode, a first color light passes through the first filtering part 731 and the decorative pattern of the first filtering part 731 is displayed on the front housing 711. Since the mobile communication device 700 is implemented to have an appearance by just being illuminated without having an additional pattern visible in the standby mode, the appearance of the mobile communication device 700 is enhanced.

As shown in FIG. 10, when the mobile communication device 700 is in an operation mode, a second color light passes through the second filtering part 732 and thus the key patterns of the second filtering part 732 are displayed on the front housing 711. A touch sensing layer may be provided inside the mobile communication device 700, and a user can move a pointer or a cursor by touching each position corresponding to each pattern of the second filtering part 732.

Figure 11:
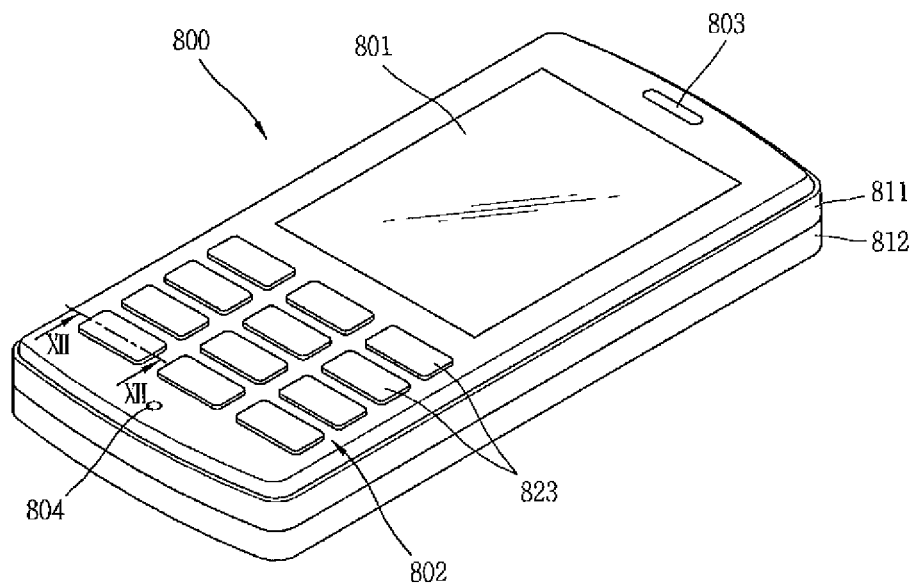
FIG. 11 is a perspective view showing a mobile communication device according to an eighth embodiment of the present invention.

In accordance with an eight exemplary embodiment of the present invention, as seen in FIG. 11, a mobile communication device 800 includes a front housing 811 and a rear housing 812. A display 801 and a keypad 802 for inputting signals are disposed at upper and lower portions of the front housing 811, respectively. A receiver (not shown), a speaker 803, and a microphone 804 may be disposed at upper and lower portions of the mobile communication device 800. The keypad 802 includes a plurality of pressable key buttons 823 for inputting characters, numbers, or symbols. The characters, numbers, or symbols can be selectively displayed by internal illumination.

Figure 12:
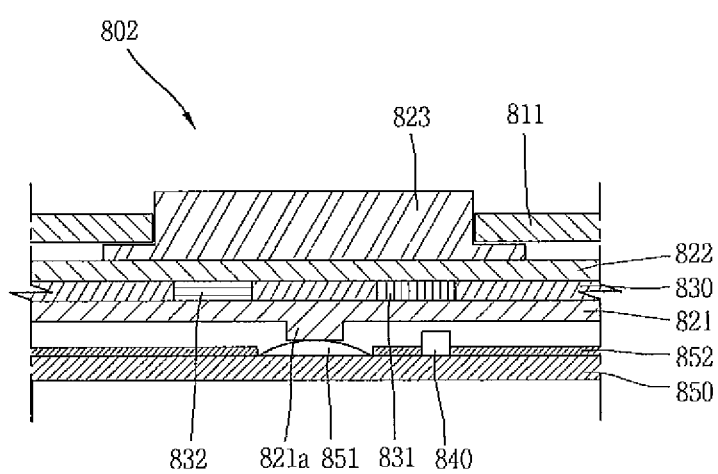
FIG. 12 is a sectional view showing the mobile communication device of FIG. 11 taken along line XII-XII.

As shown in FIG. 12, the keypad 802 includes key buttons 823 pressably disposed at the front housing 811. Each of the key buttons 823 is formed of a transparent material so that light emitted from a light emitting unit 840 can be seen therethrough. A diffusing material for evenly spreading light may be additionally provided at the key buttons 823. Each lower end of the key buttons 823 may be printed onto resin by a transparent printing layer.

Each of the key buttons 823 is supported by a laminator sequentially composed of a shielding layer 822, a filtering unit 830, and a pad 821. When the key button 823 is pressed, the laminator is pressed downward or deformed to press a corresponding dome switch 851.

A gap is formed between the laminator and a substrate 850. Also, a light emitting unit 840 for emitting different color lights according to each mode is disposed between the dome switches 851 adjacent to each other.

The pad 821 may be formed of a transparent material so that a color light emitted from the light emitting unit 840 can pass through the pad 821 and be incident on the filtering unit 830.

The filtering unit 830 includes filtering parts 831 and 832. Each filtering part 831 and 832 have two or more patterns, each pattern corresponding to one or more modes of the mobile communication device 800. Each of the filtering parts is configured to display one color light selected from color lights emitted from the light emitting unit 840 corresponding to each mode on the key buttons 823.

The filtering parts 831 and 832 may each be implemented as a thin film having a thickness sufficient to filter each wavelength of light emitted from the light emitting unit 840 except for a specific color light correspond to the filtering parts 831 and 832. The filtering parts 831 and 832 selectively filter color lights except a color light correspond to the filtering parts 831 and 832 by using an interference of light reflected at an interface between the thin films. The filtering parts 831 and 832 may be implemented as a triangular prism having regular and rough surfaces of different angles so as to selectively transmit color lights. The filtering parts 831 and 832 may be printed onto a resin such as a polyethylene terephtalate (PET) that can be contracted as the key buttons 823 are pressed.

Figure 13:
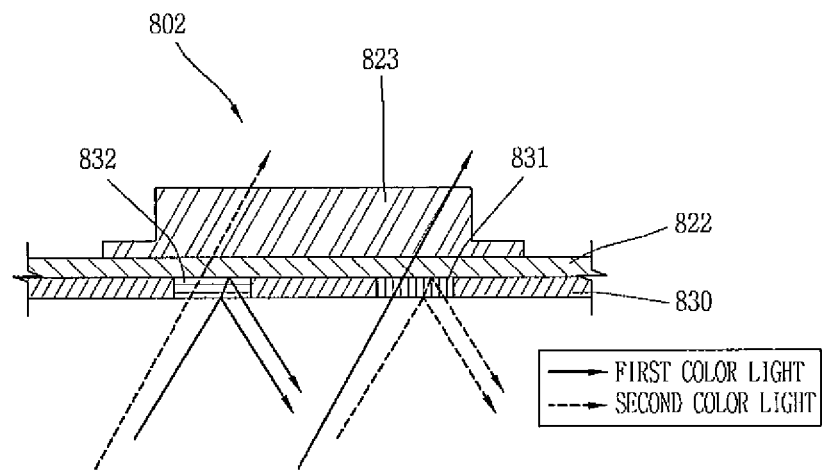
FIG. 13 is a conceptual view showing that light is selectively transmitted at a keypad of FIG. 12 according to each mode.

As seen in FIG. 13, the filtering parts are composed of the first filtering part 831 for transmitting only a first color light emitted from the light emitting unit 840, and the second filtering part 832 for transmitting only a second color light emitted from the light emitting unit 840. For instance, the first and second color lights may be implemented as a blue light and a red light, respectively. The first filtering part 831 may be formed to have a predetermined thickness or is surface-processed so that only a blue light can be transmitted and a red light can be reflected or shielded. The second filtering pail 832 may be formed to have a thickness or is surface-processed so that only a red light can be transmitted and a blue light can be reflected or shielded.

A shielding layer 822 for at least partially shielding the filtering parts 831 and 832 is disposed between the key button 823 and the filtering parts 831 and 832. The shielding layer 822 prevents a lower structure of the key button 823 formed of a transparent material from being exposed, and enhances an appearance of the mobile communication device 800.

The shielding layer 822 may be implemented by adding a transparent material to a transparent substrate. Also, the shielding layer 822 may be implemented by printing a transparent printing layer onto a transparent resin. Furthermore, the shielding layer 822 may be implemented as a printing layer disposed onto a lower surface of the key button 823, or may be implemented by adding a transparent material into the key button 823.

As is also seen in FIG. 12, a reflection sheet 852 for reflecting light emitted from the light emitting unit 840 towards the filter layer 830 is attached to an upper surface of the substrate 850. The reflection sheet 852 may be implemented as a sheet onto which a white material having a high reflectivity has been printed.

Figure 14A:
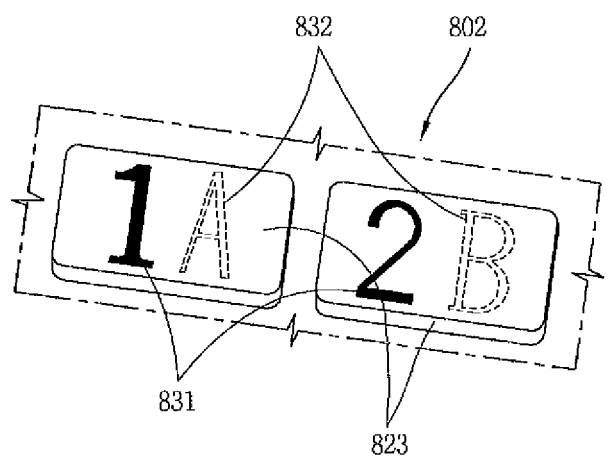
FIGS. 14A and 14B are operation views showing that characters or numbers are displayed on a key button with different colors according to each mode according to the eighth embodiment of the present invention.
Figure 14B:
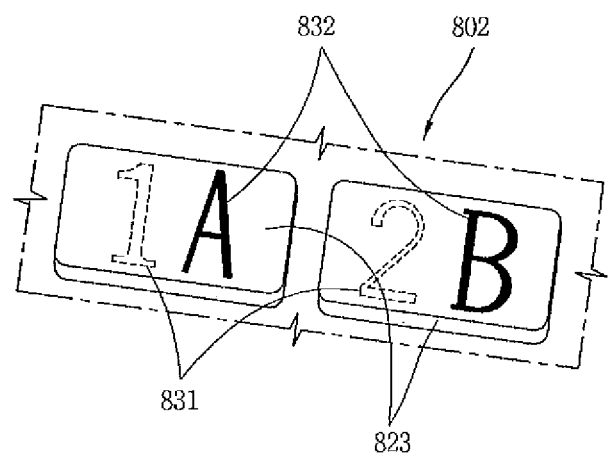

As seen in FIGS. 13, 14A, and 14B, when the mobile communication device 800 is in a first mode, a first color light is emitted from the light emitting unit 840. Then, the first color light passes through the pad 821 to be incident onto the filtering unit 830. When the first color light is incident onto the second filtering part 832, it is shielded by the second filtering part 832 to disappear or be reflected to keep on progressing. When the first color light is incident onto the first filtering part 831, it passes through the first filtering part 831 to allow a user to recognize light having the patterns of the first filtering part 831. Accordingly, the user can input the keys in a pressable manner according to the first mode (FIG. 14A).

When the mobile communication device 800 is in a second mode, a second color light is emitted from the light emitting unit 840. The second color light disappears or is reflected by the first filtering part 831, whereas it passes through the second filtering part 832. Accordingly, the user can recognize light having the patterns of the second filtering part 832 (FIG. 14B).

Figure 15A:
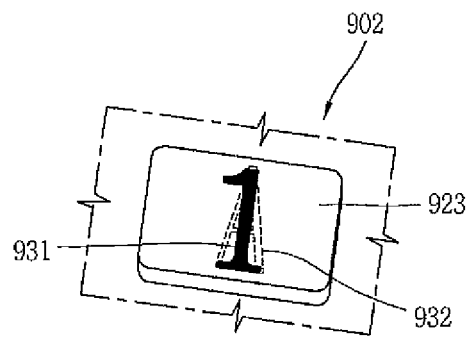
FIGS. 15A and 15B are operation views showing that characters or numbers are displayed on a key button with different colors according to each mode according to a ninth embodiment of the present invention.
Figure 15B:
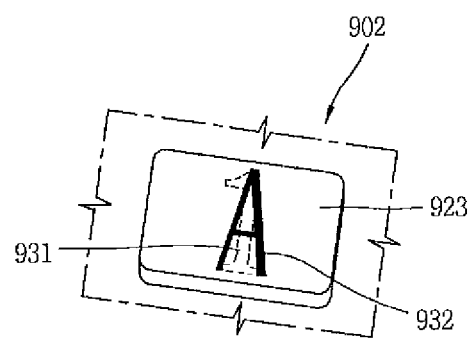

In accordance with a ninth exemplary embodiment, rather than having the first filtering part 831 and the second filtering part 832 being disposed to be spaced from each other, a first filtering part 931 and a second filtering part 932 are disposed to be overlapped with each other, as seen in FIGS. 15A and 15B. One advantage with this arrangement of the keypad is that the key areas can be reduced, thereby resulting in a smaller keypad than that shown in FIGS. 14A and 14B.

Figure 16:
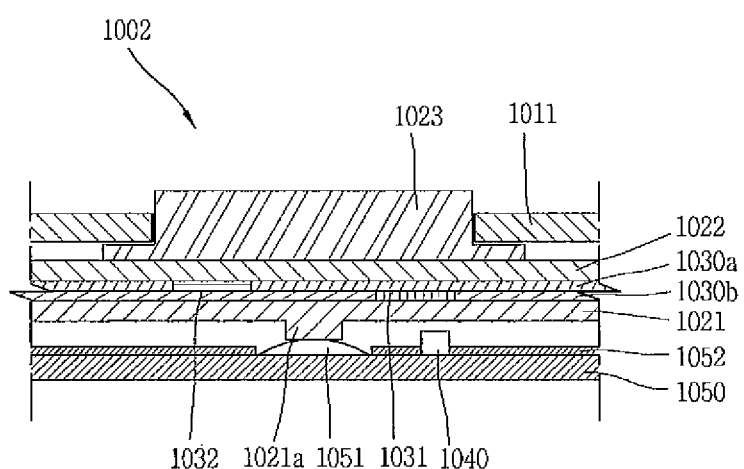
FIG. 16 is a sectional view showing a keypad having filtering units disposed on different layers according to a tenth embodiment of the present invention.

In accordance with a tenth exemplary embodiment, as seen in FIG. 16, a first filtering part 1031 and a second filtering part 1032 are disposed on different filtering units 1030a and 1030b, respectively. Since the first filtering part 1031 and the second filtering part 1032 are disposed on different filtering units 1030a and 1030b, respectively, an entire fabrication processing is facilitated by requiring only a single filtering part being located on a single filtering unit.

Figure 17:
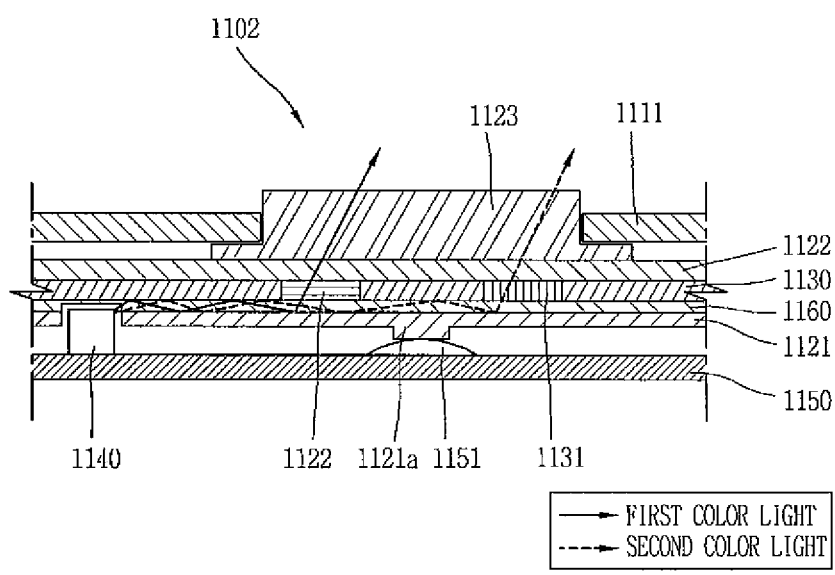
FIG. 17 is a sectional view showing a keypad having a light guiding layer below a filtering unit according to an eleventh embodiment of the present invention.

FIG. 17 shows an eleventh exemplary embodiment where a light guiding layer 1160 for horizontally guiding light emitted from a light emitting unit 1140 is disposed between filtering parts 1131 and 1132 and a pad 1121. Once one of first and second color lights is emitted from the light emitting unit 1140, the first color light or the second color light is reflected in the light guiding layer 1160 to progress in a horizontal direction. Then, the first color light passes through the first filtering part 1131 to display patterns corresponding to the first filtering part 1131 onto a key button 1123. Also, the second color light passes through the second filtering part 1132 to display patterns corresponding to the second filtering part 1132 onto the key button 1123.

As aforementioned, in the mobile communication device according to the present invention, the user can recognize the different modes based on the different patterns and the different selected colors of light. Since the user can easily recognize each mode according to each color or each pattern of the filtering parts, the user's interface and the appearance of the mobile communication device are enhanced.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communication device configured to operate in at least a first mode and a second mode, the mobile communication device comprising:
   a housing including a front housing and a rear housing;
   a single light emitting unit configured to emit at least a first color light when the mobile communication device is operated in the first mode and to emit a second color light when the mobile communication device is operated in the second mode, the light emitting unit being located in the housing; and
   a filtering unit having at least a first pattern associated with the first mode and a second pattern associated with the second mode, the filtering unit being configured to display the first pattern with the first color light in the housing when the mobile communication device is operated in the first mode and to display the second pattern with the second color light in the housing when the mobile communication device is operated in the second mode, the filtering unit being located in the mobile communication device, wherein the patterns of the filtering unit corresponding to each mode are formed on the same layer, wherein the filtering unit is implemented to filter each wavelength of color lights emitted from the light emitting unit except a color light corresponding to each pattern of the filtering unit, wherein the single light emitting unit is configured to emit different color lights, wherein the first pattern is configured to filter a color of light different from the first color light and the second pattern is configured to filter a color of light different from the second color of light, wherein the front housing includes:
a base cover formed of a transparent material to display the first pattern and the second pattern, the base cover being fixedly mounted at the rear housing; and
a shielding layer located on the base cover, the shielding layer being configured to at least partially shield the filtering unit, wherein the shielding layer includes:
a printing layer located on the base cover, the printing layer being implemented by printing ink having a color so as to shield the filtering unit and the light emitting unit when light does not originate from the light emitting unit; and
a transparent protection layer located on the printing layer to protect the printing layer, wherein a display unit is located in the front surface of the base cover, the display unit being deactivated in the first mode and the display unit being activated in the second mode, wherein the first pattern is one or more decorative symbols and the second pattern is one or more key patterns, wherein the decorative symbols are visible in the first mode and the key patterns are visible in the second mode, and wherein a touch sensing layer is located between the base cover and the filtering unit to sense a touch input applied to the second pattern displayed on the base cover.

2. The mobile communication device according to claim 1, wherein the front housing includes a key area, and the filtering unit is configured to display the first pattern with the first color light in the key area when the mobile communication device is operated in the first mode and to display the second pattern with the second color light in the key area when the mobile communication device is operated in the second mode.

3. The mobile communication device according to claim 2, wherein the housing is formed of a transparent resin.

4. The mobile communication device according to claim 1, wherein the transparent protection layer includes a resin film, the print layer is first printed onto the resin film, and then the resin film is located on the base cover by in-molding.

5. The mobile communication device according to claim 1, wherein the print layer is printed onto the base cover and then a transparent material is coated thereon to form the transparent protection layer.

6. The mobile communication device according to claim 1, wherein the touch sensing layer is a capacitance touch sensing layer configured to generate a signal by sensing a change of a capacitance generated by a touch.

7. The mobile communication device according to claim 1, further comprising a light guiding layer located below the filtering unit, the light guiding layer being configured to guide light emitted from the light emitting unit in a horizontal direction.

8. The mobile communication device according to claim 7, further comprising a reflecting layer located below the light guiding layer, the reflecting layer being configured to reflect light emitted from the light guiding layer towards the filtering unit.

9. The mobile communication device according to claim 1, wherein the first pattern of the filtering unit corresponding to the first mode and the second pattern of the filtering unit corresponding to the second mode are spaced from each other.

10. The mobile communication device according to claim 1, wherein the filtering unit includes a thin film having a thickness selected to filter each wavelength of color lights emitted from the light emitting unit except for the first color light and the second color light.

* * * * *